Nov. 3, 1931.  N. OESTREICH  1,830,209
THREADING TOOL
Filed Feb. 3, 1930  2 Sheets-Sheet 1

INVENTOR
Norman Oestreich
BY Harry Lea Dodson
ATTORNEY

Nov. 3, 1931.  N. OESTREICH  1,830,209
THREADING TOOL
Filed Feb. 3, 1930  2 Sheets-Sheet 2

INVENTOR
*Norman Oestreich*
BY *Harry Lea Dodson*
ATTORNEY

Patented Nov. 3, 1931

1,830,209

UNITED STATES PATENT OFFICE

NORMAN OESTREICH, OF MILWAUKEE, WISCONSIN

THREADING TOOL

Application filed February 3, 1930. Serial No. 425,446.

My invention relates to that class of tools designed to cut a plurality of threads at a time.

My invention has for its object, to construct a tool which will cut all of the threads on a pipe, for example, in a single revolution of the pipe.

My invention has for its further object, to so arrange the cutting tools that each one will cut only one-twelfth of the depth of the thread.

A concrete device embodying my invention, is illustrated in the accompanying drawings, which are to be considered as a part of this specification, in which—

Figure 5:
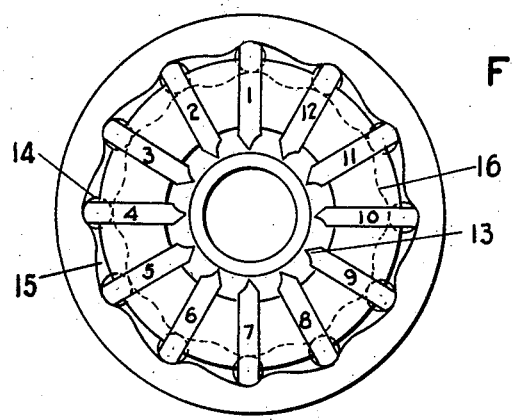
Figure 6:
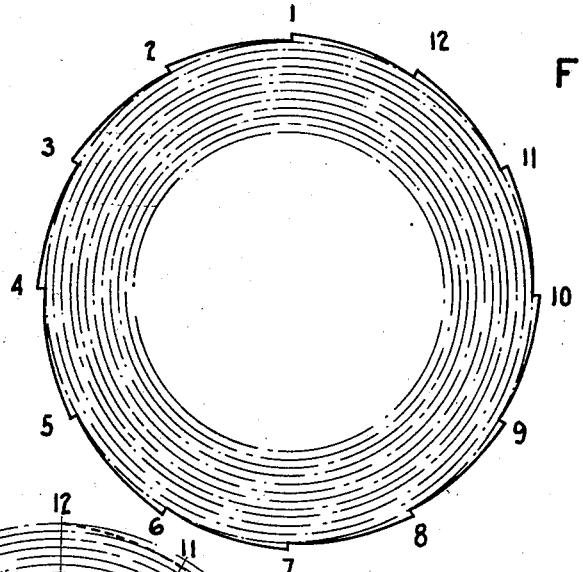
Figure 7:
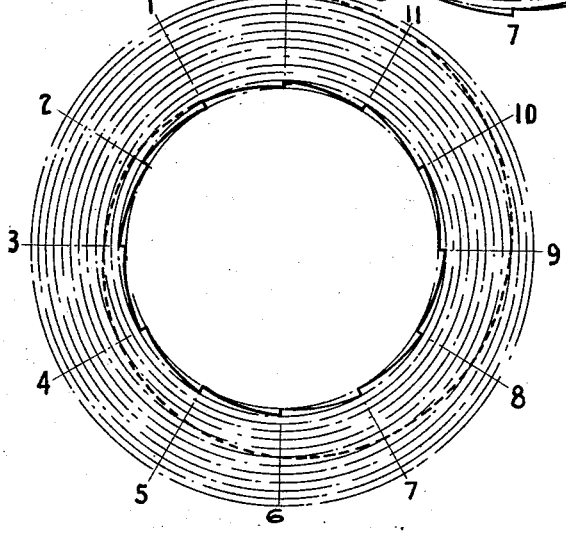

Fig. 5 is a diagram illustrating the relation of cam and chuck travel to obtain simultaneous movement of the cutters throughout complete revolution of the chuck; and Figs. 6 and 7 are diagrams of the paths of travel of a series of twelve cutting tools in the generation of the threads on a pipe. In these figures there are illustrated by 12 concentric lines the travel of the twelve tools, each subdivision indicating the total amount of cutting of the tools at one time during its travel. This is shown at the outside circle in Fig. 6 and the inside in Fig. 7, the dotted line in Fig. 7 showing the complete line of travel of a single tool but as is clearly apparent from this figure at no time is a tool cutting more than the amount indicated by the space between one of the sub-divisions.

Similar reference numerals refer to similar parts throughout the entire description.

As shown in the drawings, my invention consists of a housing A having an axially extending flange B, a series of cutters, numbered 1 to 12, which are slidably mounted in a chuck 16. Each cutter has as many teeth 13 cut on its inner end as it is desired to cut in a single revolution of the rod or pipe to be threaded, for it will be obvious that my tool can be used for threading bolts, rods or pipes, as desired.

Rollers 14 are secured to each of the cutters, in any suitable manner. These rollers 14 are mounted in a cam groove 15, so that its rotation will move the cutters radially.

Figure 4:
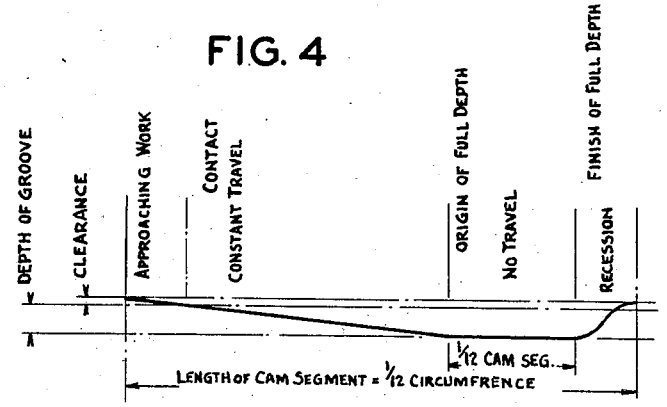
Fig. 4 is a diagram of the cam travel for radial movement of the cutters.

As shown in the cam diagram, Fig. 4, there are twelve cam segments, therefore the complete cam cycle is accomplished by a relative motion of one-twelfth circumference (i. e. 30°) between the cam and chuck. It takes one revolution of the chuck 16 to obtain this relative motion of the cam 15, therefore the twelve cam segments function simultaneously and produce the predetermined cam travel for the twelve cutters 1 to 12 during the single revolution.

The pipe thread is produced by the rotation of the pipe in counter-clockwise direction, while the cam and chuck travel in the opposite direction. As the cam 15 rotates it moves the cutters radially, as clearly shown in Fig. 4. The work or the tool is moved longitudinally a distance equal to the pitch of the thread to be cut, during each revolution the tools reaching the full depth of the thread. The finish of one groove enters the place of origin of the preceding groove. In this manner I am able to produce a standard pipe thread in a single revolution.

The speed of the cam 15 in degrees is eleven-twelfths of the speed of the chuck 16. The cam 15 turns 330° while the chuck 16 is turning 360°. This 30° difference constitutes the relative motion of the cam 15. It will thus be seen that the relative difference of the travel of the cam 15 determines the rate of radial travel of the cutters for a given circumferential rotation. This may be varied by suitable gear trains (not shown) to accommodate varying conditions of operation. Obviously, the less difference there is in the relative rotation, the slower the radial movement of the cutters, and as a resultant more revolutions will be required.

In the diagrammatic views, Figs. 6 and 7, is clearly traced the line or path of travel of each of the cutters from 1 to 12, and it is thus demonstrated that no cutter is called upon to cut more than one-twelfth of the depth of the groove in the thread being cut, regardless of the pitch.

Figure 1:
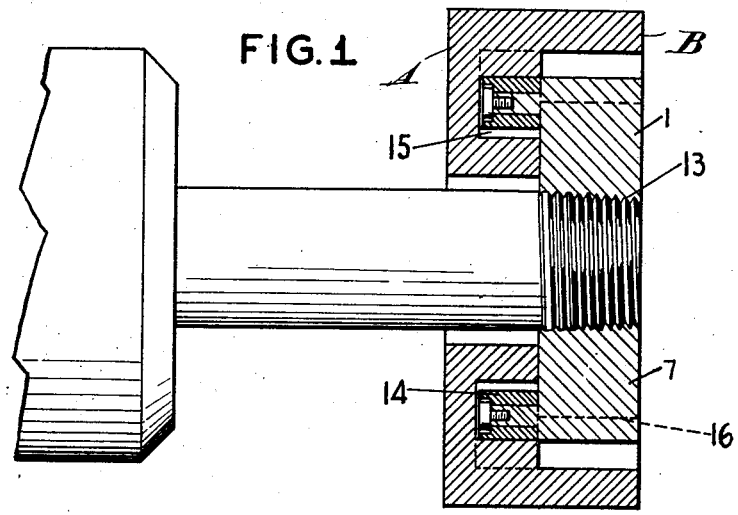
Fig. 1 is a view, partly in section, of one of my improved cutters, cutting the threads on a pipe.
Figure 2:
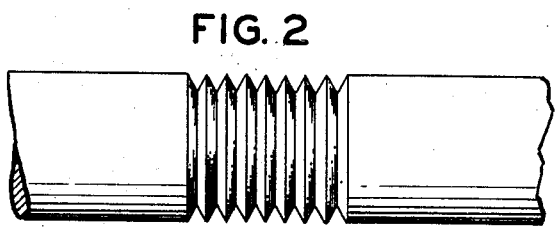
Fig. 2 is a view of a bar having a series of annular grooves cut in its center.
Figure 3:
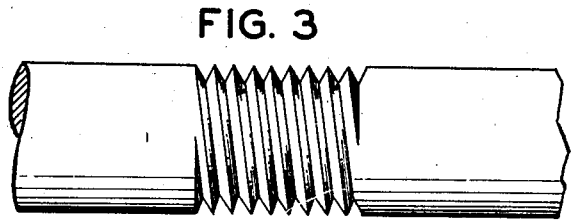
Fig. 3 is a similar view, with a helical thread.

It will be apparent, to persons skilled in the art, that with this tool it is easily possible to cut threads on any portion of a rod or pipe, as shown in Fig. 3, or a series of simple grooves, such as shown in Fig. 2, and that they can be cut very much more rapidly than is possible in a lathe, or even in a screw machine.

Having described my invention, what I regard as new, and desire to secure by Letters Patent of the United States, is:

1. In a device of the character described, an annular rotary chuck, a housing rotatable at a different speed than the chuck enclosing said chuck provided with an inwardly projecting annular flange, said flange being provided with an annular groove formed with a plurality of cam faces, a plurality of cutters which are provided with projections adapted to be received and actuated by said cams, said cutters having the desired number of teeth corresponding with the number of threads desired to be cut, the cams being so formed as to gradually feed said cutters into the work until the desired depth is obtained and then maintain the cutters in that position for a portion of a revolution of the chuck when the cutters are withdrawn completing the thread in one revolution of the chuck relative to the work to be threaded.

2. In a device of the character described, an annular rotary chuck, a housing rotatable at a different speed than the chuck enclosing said chuck provided with an inwardly projecting annular flange, said flange being provided with an annular groove formed with twelve cam faces, twelve cutters which are provided with projections adapted to be received and actuated by said cams, said cutters having the desired number of teeth corresponding with the number of threads desired to be cut, the cams being so formed as to gradually feed said cutters into the work until the desired depth is obtained and then maintain the cutters in that position for a portion of a revolution of the chuck when the cutters are withdrawn completing the thread in one revolution of the chuck relative to the work to be threaded.

3. In a device of the character described, an annular rotary chuck, a housing rotatable at a different speed than the chuck enclosing said chuck provided with an inwardly projecting annular flange, said flange being provided with an annular groove formed with a plurality of cam faces, a plurality of cutters which are provided with projections, rollers on said projections adapted to be received and actuated by said cams, said cutters having the desired number of teeth corresponding with the number of threads desired to be cut, the cams being so formed as to gradually feed said cutters into the work until the desired depth is obtained and then maintain the cutters in that position for a portion of a revolution of the chuck when the cutters are withdrawn completing the thread in one revolution of the chuck relative to the work to be threaded.

4. In a device of the character described, a annular rotary chuck, a housing rotatable a a different speed than the chuck enclosin said chuck provided with an inwardly pr jecting annular flange, said flange being pr vided with an annular groove formed with plurality of cam faces, a plurality of cutter which are provided with projections adapte to be received and actuated by said cams, sai cutters having the desired number of teet corresponding with the number of thread desired to be cut, the cams being so formed a to gradually and simultaneously feed sai cutters into the work until the desired dept is obtained and then maintain the cutters i that position for a portion of a revolution o the chuck when the cutters are withdraw completing the thread in one revolution o the chuck relative to the work to be threadec 5. In a device of the character describec an annular rotary chuck, a housing rotatabl at a different speed than the chuck enclosin said chuck provided with an inwardly pr jecting annular flange, said flange being pr vided with an annular groove formed wit twelve cam faces, twelve cutters which ar provided with projections adapted to be r ceived and actuated by said cams, said cutter having the desired number of teeth corre sponding with the number of threads desire to be cut, the cams being so formed as t gradually and simultaneously feed said cut ters into the work until the desired depth i obtained and then maintain the cutters i that position for a portion of a revolution o the chuck when the cutters are withdraw completing the thread in one revolution o the chuck relative to the work to be threadec

NORMAN OESTREICH.